Patented May 10, 1932

1,857,404

UNITED STATES PATENT OFFICE

JOHN E. SCHOTT, OF BAYONNE, NEW JERSEY, ASSIGNOR TO THE ATLANTIC REFINING COMPANY, OF PHILADELPHIA, PENNSYLVANIA, A CORPORATION OF PENNSYLVANIA

REMOVAL OF WAX FROM OIL

No Drawing.      Application filed July 5, 1929. Serial No. 376,287.

My invention relates to the art of removing wax from wax-containing oil, as petroleum, and more particularly to a process in which a substance is added to the wax-containing oil, thereby to condition the oil so that the wax may be more readily removed therefrom.

I have found that by adding a petroleum residue to a wax-containing oil before the oil is subjected to any of the well-known separation operations, then after such addition subjecting the oil to a separating operation, as for example, cold settling, centrifuging, filtering, or the equivalent, the wax will more readily separate from the oil.

Furthermore, I have found that the petroleum residue may be added to the wax-containing oil in any suitable manner, as for example, by first extracting it with a suitable solvent, such as naphtha or the like, then adding the extract to the oil, or by the addition of petroleum residue as such to the oil. In either instance the petroleum residue is advantageously added to the wax-containing oil while the oil is hot, preferably while the temperature of the oil is above 70° F. After the addition of the petroleum residue to the oil it may be treated by any of the well-known processes for removing wax from oil, such as, by the cold settling process which involves chilling the oil and allowing it to stand, or by the centrifuging process which involves chilling the oil then passing it into a centrifuge, or by filtering the oil-wax mixture after chilling through a suitable filtering medium. But I do not limit my invention to wax separating processes involving chilling.

In separating wax from oil by processes involving chilling the temperature to which the wax-containing oil is chilled depends largely upon the particular pour desired of the ultimate oil product. I have found, in general, that chilling of the wax-containing oil to +10° F., or below, according to the pour desired, will produce satisfactory results by my process. However, I do not contemplate being limited to any specific temperatures of chilling.

A particular advantage of my process is that the wax content of the wax-containing oil forms larger crystals or crystal aggregates during the chilling so that separation of solid from liquid may be more readily effected, as for example, by cold settling, centrifuging, filtering or the like.

As a specific example of my process but without intending to limit my invention thereto, a lubricating oil containing wax, more particularly a high viscosity fraction obtained from the non-cracking distillation of a Mid-Continent crude petroleum was diluted with naphtha to the extent of 35 parts of oil to 65 parts of naphtha. To three hundred parts of the diluted oil there was added, while the oil was at a temperature of about 140° F., approximately one part of petroleum residue, in this particular instance, a residue obtained from a cracking distillation of a gas oil, such cracking having been carried out at high temperatures and under considerable pressure in a cracking still of the Lewis type as disclosed in United States Patent No. 1,364,443. The diluted oil containing the petroleum residue was then chilled to a temperature of about 0° F., at which the wax to be removed appeared as a separate phase, and the oil-wax mixture was allowed to stand while at such low temperature, thereby to effect settling. As a check the same procedure was carried out except that the addition of petroleum residue to the diluted oil was omitted. After allowing each of the oils to stand for twelve hours it was found that the wax in the oil to which the petroleum residue had been added settled out and collected as a lower layer in the oil, leaving an upper layer representing 70 to 75 per cent of the total oil clear and substantially free from wax particles, while the wax in the oil which contained no petroleum residue had settled to no appreciable extent.

Microscopic examinations showed that wax aggregates formed in the oil to which the petroleum residue was added, while in the oil to which such residue was not added the wax separated as individual crystals and showed little or no evidence of the formation of aggregates.

In the example just given a petroleum residue obtained from a cracking distillation was used. There may also be used residues obtained from non-cracking distillations of petroleum. As a specific example of my process using a residue of the latter type, the wax-containing oil was diluted using 65 parts of naphtha to 35 parts of the oil. While the diluted oil was at a temperature of about 140° F. there was added to three hundred parts thereof approximately one part of a residue which resulted from the non-cracking distillation of a Mid-Continent crude petroleum. The oil to which the residue had been added was then chilled to a temperature of +5° F. which was sufficient to cause the wax to be removed to appear as a separate phase uniformly distributed throughout the body of oil. The oil-wax mixture was allowed to stand while maintained at such chilling temperature for twenty-two hours. It was found that settling occurred, leaving a top layer of clear oil representing about 60 per cent of the total oil; while in a blank determination carried out under the same conditions but without the addition of the residue there was no appreciable settling during the same period.

By way of more particularly identifying the residues used in each of the above examples, in the first the residue was a black liquid having a flash point of 160° F. (Pensky-Martin), gravity of 12° A. P. I. and a viscosity of 300 seconds Saybolt at 100° F.

In the second example, the residue used was a semi-solid asphaltic material obtained by the non-cracking distillation in a pipe-still of a Texas crude to 8.2% bottoms. This material had a gravity of 9.9° A. P. I., flash point of 430° F. (open cup) and a melting point of 109° F. (ball and ring method).

It is to be understood that my invention comprehends broadly the use of petroleum residues from cracking and/or non-cracking distillations, as an aid in separating wax from a wax-containing oil, and that specific oils and residues referred to herein are, in so far as they reslate to the broad idea, for the purpose of illustration only.

It is therefore obvious that by adding one or more petroleum residues of the types indicated above to a wax-containing oil there results the particularly desirable effect of conditioning the oil so that the wax may be more readily separated therefrom both with regards rate and completeness of separation.

It will be understood that in some instances it may be found unnecessary to dilute the wax-containing oil before chilling and therefore I do not contemplate limiting my invention in this respect. Furthermore, it is to be understood that my process may be used for the separation of wax from any wax-containing oil or mixture of wax-containing oils, more particularly for the removal of wax from petroleum oil, either crude petroleum or any wax-bearing portion thereof, or mixture of them.

What I claim is:

1. A method for dewaxing a wax-containing oil involving separation of wax from oil, which comprises adding to the oil a petroleum distillation residue of low A. P. I. gravity, thereby to condition the wax-containing oil to cause wax agglomeration, thereafter removing wax from the oil.

2. A method for dewaxing a wax-containing oil involving separation of wax from oil, which comprises adding to the oil a petroleum distillation residue of low A. P. I. gravity, thereby to condition the wax-containing oil to cause wax agglomeration, chilling the wax-containing oil, thereafter removing wax from the oil.

3. A method for dewaxing a wax-containing oil involving separation of wax from oil, which comprises adding to the oil while it is at a temperature in excess of 10° F., a petroleum distillation residue of low A. P. I. gravity, thereby to condition the wax-containing oil to cause wax agglomeration, chilling the oil to a temperature below 10° F., thereafter removing wax from the oil.

4. A method for dewaxing a wax-containing oil involving separation of wax from oil, which comprises heating the oil, dissolving in the oil a petroleum distillation residue of low A. P. I. gravity, thereby to condition the wax-containing oil to cause wax agglomeration, chilling the oil, thereafter removing wax from the oil.

5. A method for dewaxing a wax-containing oil involving separation of wax from oil, which comprises dissolving in the oil a petroleum distillation residue of low A. P. I. gravity, thereby to condition the wax-containing oil to cause wax agglomeration, the oil being at a temperature in excess of 10° F. at the time the residue is added thereto, subsequently chilling the oil to a temperature below 10° F., thereafter, removing wax from the oil.

6. A method for dewaxing a wax-containing oil involving separation of wax from oil, which comprises diluting the oil to reduce its viscosity, adding to the diluted oil a petroleum distillation residue of low A. P. I. gravity, thereby to condition the wax-containing oil to cause wax agglomeration, chilling the oil, thereafter removing wax from the oil.

7. A method for dewaxing a wax-containing oil involving separation of wax from oil which comprises diluting the oil, adding thereto a petroleum residue of low A. P. I. gravity resulting from a cracking distillation, thereby to condition the wax-containing oil to cause wax agglomeration, chilling the oil, thereafter removing wax from the oil.

8. A method for dewaxing a wax-containing oil involving separation of wax from oil, which comprises diluting the oil, adding thereto a residue of low A. P. I. gravity from the non-cracking distillation of petroleum, thereby to condition the wax-containing oil to cause wax agglomeration, chilling the oil to a temperature below 10° F., and removing wax from the oil.

9. A method for dewaxing a wax-containing oil involving separation of wax from oil, which comprises diluting the oil, dissolving a petroleum distillation residue of low A. P. I. gravity in the oil, thereby to condition the oil to cause wax agglomeration, chilling the oil to a temperature at which wax to be removed is solidified, the solidified wax as a result of conditioning the oil forming into agglomerates, and removing wax so solidified from the oil.

10. A method for dewaxing a wax-containing oil involving separation of wax from oil, which comprises diluting the oil, dissolving therein a petroleum distillation residue of low A. P. I. gravity, thereby to condition the oil to cause wax agglomeration, chilling the oil to a temperature below 10° F., whereupon wax solidifies and forms as agglomerates, and removing wax so solidified from the oil.

11. A method for dewaxing a wax-containing oil involving separation of wax from oil which comprises adding to the oil a residue of low A. P. I. gravity from the cracking distillation of petroleum, thereby to condition the wax-containing oil to cause wax agglomeration, thereafter chilling the oil and removing wax therefrom.

12. A method for dewaxing a wax-containing oil involving separation of wax from oil which comprises adding to the oil a residue of low A. P. I. gravity from the non-cracking distillation of petroleum, thereby to condition the wax-containing oil to cause wax agglomeration, thereafter chilling the oil and removing wax therefrom.

13. A method for dewaxing a wax-containing oil involving separation of wax from oil which comprises diluting the oil to reduce its viscosity, adding to the diluted oil a petroleum distillation residue of low A. P. I. gravity, thereby to condition the wax-containing oil to cause wax agglomeration, thereafter chilling the oil to a temperature below 10° F., and removing wax from the oil.

14. A method for dewaxing a wax-containing oil involving separation of wax from oil which comprises diluting the oil, adding to the diluted oil a residue of low A. P. I. gravity from the cracking distillation of petroleum, thereby to condition the oil to cause wax agglomeration, thereafter chilling the oil to effect crystallization of wax and formation into crystal agglomerates, and removing wax so crystallized from the oil.

JOHN E. SCHOTT.